United States Patent
Zoulias et al.

(10) Patent No.: US 11,949,592 B1
(45) Date of Patent: Apr. 2, 2024

(54) SOFTWARE-DEFINED TRAFFIC ROUTING MESH NETWORK

(71) Applicant: Perfecta Federal, LLC, Springfield, VA (US)

(72) Inventors: George Zoulias, Springfield, VA (US); Blake Watson, Springfield, VA (US)

(*) Notice: Subject to any disclaimer, the term of this patent is extended or adjusted under 35 U.S.C. 154(b) by 0 days.

(21) Appl. No.: 18/228,490

(22) Filed: Jul. 31, 2023

Related U.S. Application Data (60) Provisional application No. 63/445,440, filed on Feb. 14, 2023.

(51) Int. Cl.
H04L 45/00 (2022.01)
H04L 9/40 (2022.01)
H04L 41/082 (2022.01)
H04L 45/42 (2022.01)

(52) U.S. Cl.
CPC .......... *H04L 45/566* (2013.01); *H04L 41/082* (2013.01); *H04L 45/42* (2013.01); *H04L 63/20* (2013.01)

(58) Field of Classification Search
CPC ..... H04L 45/566; H04L 41/082; H04L 45/42; H04L 63/20
See application file for complete search history.

(56) References Cited

U.S. PATENT DOCUMENTS

| | | | |
|---|---|---|---|
| 9,398,113 B2 * | 7/2016 | Aggarwal | H04L 67/535 |
| 11,546,323 B1 * | 1/2023 | Jones | H04L 63/083 |
| 2012/0084464 A1 * | 4/2012 | Cochinwala | H04L 43/50 |
| | | | 709/246 |
| 2016/0013980 A1 * | 1/2016 | McKnight | H04L 67/568 |
| | | | 709/221 |

* cited by examiner

*Primary Examiner* — Chris Parry
*Assistant Examiner* — Steven C Nguyen (57) ABSTRACT

A software-defined traffic routing mesh network for routing network data traffic may include a first plurality of operations network nodes that route network data traffic between one or more client devices and an external network. The mesh network may further include a second plurality of maintenance network nodes that provides maintenance services for at least the first plurality of operations network nodes, and a third plurality of procurement network nodes that are used to procure each operations network node by being used to procure at least one of a hardware component or a software component for each operations network node from one or more third-party vendors. Each of the first plurality of operations network nodes, the second plurality of maintenance network nodes, and the third plurality of procurement network nodes in the mesh network are deployed in multiple tiers.

18 Claims, 4 Drawing Sheets

SOFTWARE-DEFINED TRAFFIC ROUTING MESH NETWORK

CROSS-REFERENCE TO RELATED PATENT APPLICATION

This application claims priority to U.S. Provisional Patent Application No. 63/445,440, filed on Feb. 14, 2023, entitled "Software-Defined Traffic Routing Mesh Network," which is hereby incorporated by reference in its entirety.

BACKGROUND

The Internet has become an integral part of daily life for most people, and many people are at least somewhat familiar with the notion that their online activities on the Internet leave digital signatures that can be traced. For example, when a user visits a website, information such as the user's Internet Protocol (IP) address, an approximate physical location of the user, the user's time zone and language preference may be collected by an Internet Service Provider (ISP) or a third-party monitoring entity. In addition, the operating system, browser type, software, fonts, audio stack, and plug-ins of the user may be determined to provide a digital signature of the user. Various entities, including private companies and government organizations, may monitor and track such digital activities and signatures. For example, a company may track the digital signatures of website visitors to enhance marketing capabilities by identifying the information of individuals and organizations that visited a website, the identities of such individuals and organizations, as well as the locations of such individuals and organizations.

Accordingly, Internet research and other activities conducted by some individuals and organizations that are sensitive in nature may require some degree of obfuscation. For example, a law firm may need to explore information related to a potential lawsuit without leaving digital traces that can be attributed to their firm. Similarly, an investment banking organization may need to conduct private due diligence research in anticipation of financing a start-up or prior to participating in a merger or acquisition. While conducting investigative work, federal and state government agencies may have legitimate needs to cloak their digital signatures so that criminal organizations are not tipped off to their identities. This is because some criminal organizations may have sufficient technological capabilities to detect and identify digital signatures associated with law enforcement activities.

To prevent online tracking, anonymity networks like the Onion Router (Tor) and the Invisible Internet Project (i2p) have emerged to conceal user identities by removing links between a user's IP address, the user's digital fingerprint, and the user's online activities. In addition, to establish a secure and private online presence, virtual private networks (VPNs) are available for use that can provide tunneling and encryption of transmitted data. While such anonymity networks and VPNs support privacy and secure Internet services such as web browsing and Voice over Internet Protocol (VoIP) for individuals, these solutions have some deficiencies when used by organizations. Anonymity networks can be slow, and activity logs of the associated cyber activities are often inaccessible. While an organization may want to obscure Internet traffic from some entities that are monitoring activity, from a defensibility perspective, the organization may need to know and be able to audit the cyber activities engaged in by their employees.

SUMMARY

Described herein is a software-defined traffic routing mesh network that utilizes secure private network connections, such as virtual private networks (VPNs) connections, and a high availability (HA) mesh topology to route network data traffic while modifying the digital signature of the internet traffic. Accordingly, incoming and outgoing network data traffic from client devices may be obfuscated so that the network data traffic of the client devices may appear to come from network locations that are different from the actual network locations of the client devices. For example, the software-defined traffic routing mesh network may include exit network nodes to the Internet that provide points of presence (POP) at various locations around the world, such that the network infrastructure behind the network data traffic and the origins of network data traffic are obfuscated from a monitoring entity. Furthermore, the use of POP at various locations may enable network data traffic from the client devices to blend in with local network data traffic at the various locations, thereby further obfuscating sensitive network data traffic from the attention of the monitoring entities. In some instances, the software-defined traffic routing mesh network may further modify the language packs, web browsers, and/or operating systems associated with the network data traffic of the client devices as the network data traffic is routed through the mesh network. This may further obfuscate the nature of the network data traffic or blend the network data traffic with local network data traffic at various locations. Nevertheless, the software-defined traffic routing mesh network may include internal monitoring services that track network data activities (e.g., sensitive searches, messages, etc.) that are routed through the mesh network, so that such activities are internally logged and traceable by an administrative entity.

In some embodiments, a software-defined mesh network for routing network data traffic may include a first plurality of operations network nodes that route network traffic between one or more client devices and an external network. The mesh network may further include a second plurality of maintenance network nodes that provides maintenance services for at least the first plurality of operations network nodes, and a third plurality of procurement network nodes that are used to procure each operations network node by being used to procure at least one of a hardware component or a software component for each operations network node from one or more third-party vendors. Each of the first plurality of operations network nodes, the second plurality of maintenance network nodes, and the third plurality of procurement network nodes in the mesh network are deployed in multiple tiers.

In other embodiments, an architecture plan for a software-defined traffic routing mesh network that includes multiple tiers of network nodes for routing network data traffic between one or more client devices and an external network may be received. The network nodes for the multiple tiers may be procured via a computing device associated with a mesh network provider or via procurement network nodes in one or more of the multiple tiers that are associated with different independent entities. A configuration file may be further generated based at least on the architecture plan and node information of procured network nodes, the configuration file for configuring the network nodes in the multiple tiers into the software-defined traffic routing mesh network.

The configuration file may be further implemented to upload corresponding sets of network connection configurations into each node in the multiple tiers to network each node with one or more other network nodes to create the software-defined traffic routing mesh network.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Described herein is a software-defined traffic routing mesh network that utilizes secure private network connections, such as virtual private networks (VPNs) connections, and a high availability (HA) mesh topology to route network data traffic while modifying the digital signature of the internet traffic. Accordingly, incoming and outgoing network data traffic from client devices may be obfuscated so that the network data traffic of the client devices may appear to come from network locations that are different from the actual network locations of the client devices. For example, the software-defined traffic routing mesh network may include exit network nodes to the Internet that provide points of presence (POP) at various locations around the world, such that the network infrastructure behind the network data traffic and the origins of network data traffic are obfuscated from a monitoring entity. Furthermore, the use of POP at various locations may enable network data traffic from the client devices to blend in with local network data traffic at the various locations, thereby further obfuscating sensitive network data traffic from the attention of the monitoring entities. In some instances, the software-defined traffic routing mesh network may further modify the language packs, web browsers, and/or operating systems associated with the network data traffic of the client devices as the network data traffic is routed through the mesh network. This may further obfuscate the nature of the network data traffic or blend the network data traffic with local network data traffic at various locations. Nevertheless, the software-defined traffic routing mesh network may include internal monitoring services that track network data activities (e.g., sensitive searches, messages, etc.) that are routed through the mesh network, so that such activities are internally logged and traceable by an administrative entity. In this way, individuals and organizations with legitimate reasons for obfuscating their digital signatures while conducting online activities may be assured that such online activities are not easily attributable to them. Additionally, such individuals and organizations may be further assured that while their online activities and the online activities of their employees are obscured from monitoring entities, such activities are nevertheless internally auditable by the individuals and organizations.

Example Overall Architecture

Figure 1:
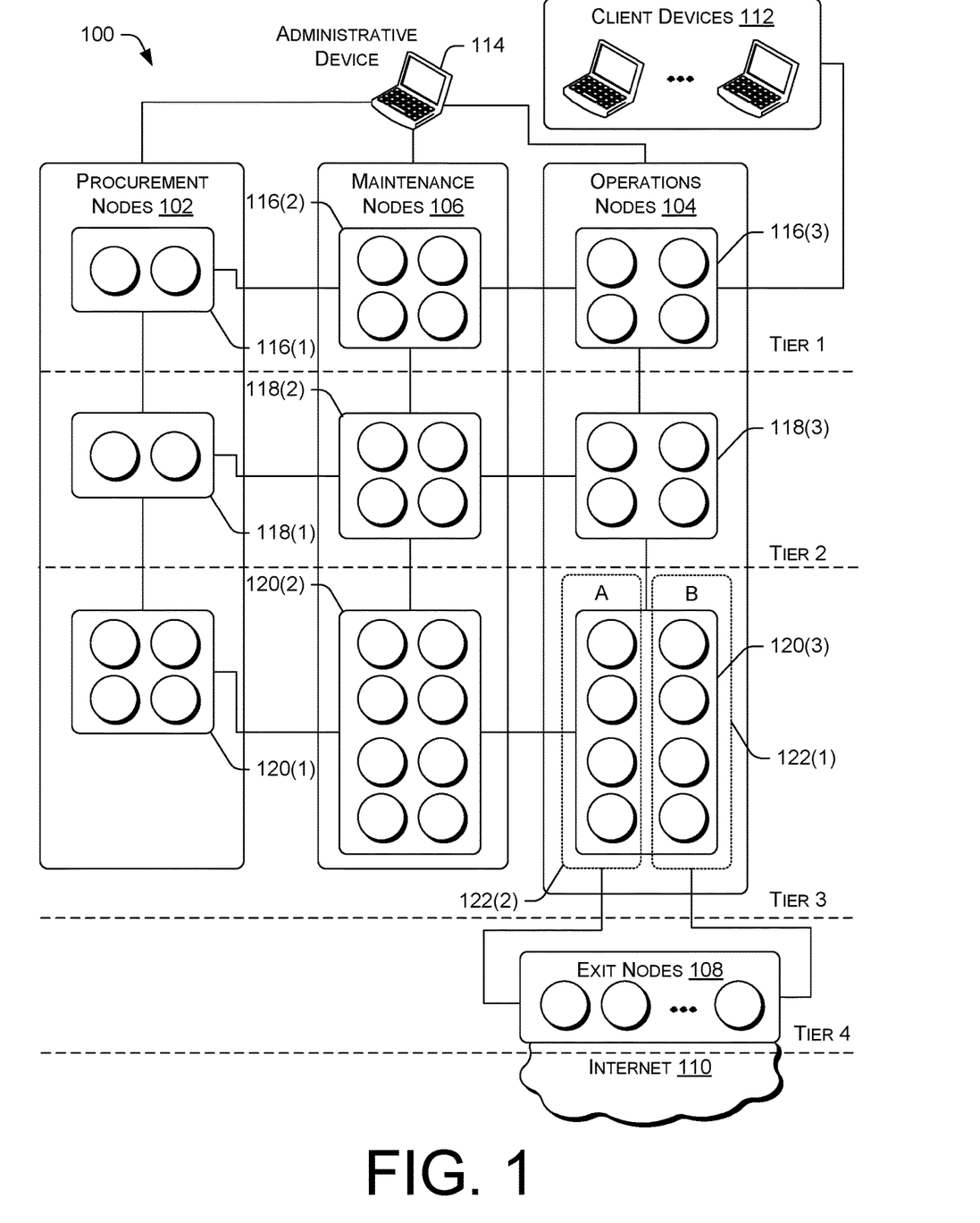
FIG. 1 illustrates an example architecture of a software-defined traffic routing mesh network that routes network data traffic and modifies the digital signature of the network data traffic.

FIG. 1 illustrates an example architecture of a software-defined traffic routing mesh network 100 that routes network data traffic and modifies the digital signature of the network data traffic. The mesh network 100 may include multiple network nodes that are deployed into multiple tiers. For example, as shown in the example architecture, the mesh network 100 may include a total of four tiers. Furthermore, there are three different types of network nodes in each tier of the first three tiers, in which each type of network node performs a different set of corresponding functions within the mesh network 100. These different types of network nodes may include procurement network nodes 102, operations network nodes 104, and maintenance network nodes 106. The fourth tier of the mesh network 100 may include multiple exit network nodes 108 that serve as network connection points for the mesh network 100 to connect to an external network, such as the Internet 110. As illustrated in the example architecture, each of the network nodes in the mesh network 100 is represented by a corresponding circle.

The procurement network nodes 102 may be used to acquire the hardware components and/or software components for the creation of various network nodes during an initial deployment of the mesh network 100. The operations network nodes 104 are configured to route network data traffic between one or more client devices 112 and the exit network nodes 108. The one or more client devices 112 may include computing devices that are used to access various websites and online services available from the Internet. For example, such computing devices may include smartphones, laptops, desktop computers, servers, Internet-of-Things (IoT) devices, and/or so forth. The one or more client devices 112 may connect to the mesh network 100 via one or more operations networks node in the first tier of the mesh network 100. Accordingly, incoming and outgoing network data traffic of a client device may be routed through a series of operations network nodes in the multiple tiers of the mesh network 100 to an exit network node via a secure private network channel to ensure private point-to-point data routing. In various embodiments, such a secure private channel may be formed using multiple virtual private network (VPN) connection hops between the operations network nodes in the multiple tiers. Further, since the exit network nodes may be located anywhere around the world, they may provide customized attribution to the network data traffic. For example, if one of the client devices 112 is used to conduct a web search using a web search engine and the web search is routed through a particular exit network node of the exit network nodes 108 to the Internet, the IP address and/or other digital signature information of the client device are not observable to the web search engine. Instead, only the digital signature information (e.g., IP address, virtual machine (VM) information, etc.) related to the exit network node are observed by the web search engine.

The maintenance network nodes 106 may be used to perform maintenance services for the other network nodes. Such maintenance services may include configuration of the operations network nodes 104 and/or the procurement network nodes 102, monitoring and logging of network activities that transited through the operations network nodes 104 and/or the procurement network nodes 102, emergency access to the operations network nodes 104 and/or the procurement network nodes 102, and/or so forth.

Each of the network nodes may include hardware components and software components that are implemented to perform the various tasks assigned to each network node. In various embodiments, each network node may include a hardware component, such as a computing device that is configured to execute software applications and interact with other computing devices of the other network nodes, an administrative device 114 of the mesh network provider, etc. In various embodiments, the administrative device 114 may be a laptop, a desktop computer, a server, or any other real or virtual computing device that is used by the provider to configure and manage the entire software-defined traffic routing mesh network. Each network node may be configured with a software component, such as software applications and/or third-party software services (e.g., hypervisors, virtual machines, containers, etc.) that enable the network node to perform its assigned tasks. For example, the network nodes may be implemented using software services that are provided by virtual private server (VPS) providers, a cloud computing service providers, internet service providers (ISPs), and/or so forth. In the case of operations network nodes 104, such software service may enable the executions of applications that implement secure private network connections, e.g., VPN connections using a secure network protocol, e.g., IPSec, OpenVPN, etc., to route incoming and outgoing network data traffic of the one or more client devices 112 through the tiers of the mesh network. Furthermore, the hardware component and/or software component of an operations network node may be further used to execute applications that modify the metadata of network data traffic that passes through the node. For example, metadata identifying the language packs, web browsers, and/or operating systems associated with network data traffic from a client device may be substituted with alternative metadata as the network data traffic is routed through the node.

In the case of maintenance network nodes 106, the hardware component and/or software component of a maintenance network node may be further used to execute applications for configuring the operations network nodes 104 and/or the procurement network nodes 102, as well as monitoring and logging the network data traffic that is routed through the operations network nodes 102. For example, the network activity log for the network activity of a client device may indicate time and date of each activity, a source IP address of the network activity, a destination IP address of the network activity, a visited URL of the network activity, content identifiers of content that are associated with network activity, the identifiers (e.g., network addresses) of the operations network nodes that transited the data of the network activity through the mesh network 100, and/or so forth.

As shown in the example architecture, there are 8 procurement network nodes, 16 maintenance network nodes, and 16 operations network nodes distributed among the first three tiers of the mesh network 100. For example, the first tier may include two procurement network nodes in a group 116(1), four maintenance network nodes in a group 116(2), and four operations network nodes in a group 116(3). The first tier may also be referred to as the entry tier as it connects directly with the one or more client devices 112 and provides the one or more client devices 112 with access to the mesh network. Likewise, the second tier may include two procurement network nodes in a group 118(1), four maintenance network nodes in a group 118(2), and four operations network nodes in a group 118(3). The third tier may include the double number of network nodes as each of the other tiers. As shown, the third tier may include four procurement network nodes in a group 120(1), eight maintenance network nodes in a group 120(2), and eight operations network nodes in a group 120(3). The fourth tier is made up of the multiple exit network nodes 108 that are connected to the operations network nodes in the third tier (e.g., the group 120(3)). Accordingly, the network nodes of the same type in the mesh network 100 may form corresponding communication channels across all the tiers of the mesh network. Specifically, all the operations network nodes in the mesh network 100 may form one or more corresponding priority operations channels, i.e., secure private channels, through the mesh network. For example, such a secure private channel may include a first VPN connection hop between an operations network node in the group 116(3) of the first tier and an operations network node in the group 118(3) of the second tier, a second VPN connection hop between the operations network node in the group 118(3) of the second tier and an operations network node in the group 120(3) of the third tier, and a third VPN connection hop between the operations network node in the group 120(3) of the third tier and an exit network node in the fourth tier. Likewise, all the maintenance network nodes in the mesh network 100 may form one or more corresponding maintenance channels through the mesh network 100 via VPN connection hops between nodes in the multiple tiers. Similarly, all the procurement network nodes in the mesh network 100 may form one or more corresponding procurement channels through the mesh network 100 via VPN connection hops between nodes in the multiple tiers. As such, data carried in each communication channel of a particular node type does not generally cross over to other communication channels of other node types. The number of exit network nodes 108 may vary according to design preference but is typically in the tens of nodes. In various embodiments, the attributable geographical locations of the exit network nodes, as indicated by their identification information (e.g., network addresses, publicly accessible information of associated entities, etc.), may vary accordingly to an architecture plan for the mesh network 100. For example, in some instances, at least some of the exit network nodes may be dispersed in different geographical locations that fall under different legal jurisdictions (e.g., in different states, different countries, etc.). In other instances, at least some of the exit network nodes may be located in a geographical region that falls under a single legal jurisdiction but may be attributed to different locations within the legal jurisdiction (e.g., different locations within a city, different locations in a building, etc.).

Furthermore, the number of tiers and the number of network nodes in each tier of the mesh network 100 is an example implementation. In other embodiments, the mesh network 100 may include any number of tiers and any number of network nodes in each tier so long as there is at least one tier of operations network nodes and maintenance network nodes, in which the operations network nodes are connected to a tier of exit network nodes. Generally speaking, since a mesh network with more tiers enables the mesh network to have more VPN connection hops between the tiers, increasing the number of tiers in a mesh network results in increased obfuscation of the traceable characteristics of network data traffic routed through the mesh network from monitoring entities.

In some embodiments, each group of nodes in a tier, such as each of the groups 116(1), 116(2), and 116(3), may include a primary network node and a number of backup network nodes. The primary network node is responsible for performing the tasks associated with the particular type of network nodes in the group until a failover event occurs. At such, a designated backup network node will take over the performance of the tasks. Such node failover may be configured to continue to occur as additional network nodes in the group fail as long as at least one backup network node is available. For example, with respect to the group 116(3), a primary operations network node in the group may be responsible for routing network data traffic of the one or more client devices 112 to an operations network node in the group 118(3). However, if the primary operations network node fails, a designated backup network node in the group 116(3) may take over the routing of the network data traffic to the operations network node in the group 118(3). In other embodiments, the nodes in each group of a tier, such as each of the group 116(1), 116(2), and 116(3), may be configured to jointly perform tasks in a load-balanced fashion using various load balancing algorithms (e.g., round robin, weighted round robin, etc.). For example, with respect to the group 116(3), the operations network node in the group may route the network data traffic of the one or more client devices 112 to the operations network node in the group 118(3) in a round-robin fashion. Nevertheless, regardless of the routing implementation, the mesh network 100 is configured to keep network data traffic of client devices flowing through the network to one or more exit network nodes as long as at least one operations network node in each of the tiers leading to the one or more exit network nodes is active.

In various embodiments, the network nodes in the tiers may be implemented using hardware components and/or software components (e.g., third-party software services) that are located in different legal jurisdictions. For example, the hardware components and/or software components used to implement the network nodes in a first tier may be located in a first legal jurisdiction, and the hardware components and/or software components used to implement the network nodes in a second tier may be located in a second legal jurisdiction. Further, the hardware components and/or software components used to implement the network nodes in a third tier may be located in a third legal jurisdiction. For a hardware component, being located in a legal jurisdiction means that the hardware component is physically located at a geographical location that is subject to the authority of the legal jurisdiction. For a software service, being located in a legal jurisdiction means that the software service is identified by its service provider as serving a region that is subject to the authority of the legal jurisdiction. In various embodiments, legal jurisdictions may be different when they correspond to different states with a country, different countries, different supranational unions, or any combination thereof (e.g., a country and a supranational union).

As further shown in FIG. 1, the number of nodes in each group may double from the second tier to the third tier (egress tier). As used herein, an egress tier refers to the tier in a mesh network that is immediately before the exit network node tier. The doubling of the number of operations network nodes from a previous tier to an egress tier may enable the group of operations network nodes in the egress tier (e.g., group 120(3)) to be configured with a plurality of operations network node branches, such as branches 122(1) and 122(2), without comprising node redundancy. Each of the plurality of operations network nodes branches may be implemented using hardware components and/or software components that are located in different legal jurisdictions, in which each legal jurisdiction is associated with a different level of security risk. The level of security risk in each legal jurisdiction is a function of the assessed risk of network data traffic that are routed through one or more network nodes in that legal jurisdiction being monitored or intercepted by one or more monitoring entities in that legal jurisdiction. The monitoring entities may be governmental entities, private entities, and/or so forth. For example, the branch 122(1) may be designated as a higher security risk branch as the underlying hardware components and/or software components that support the one or more network operations network nodes in the branch are located in a country with a comparatively more intrusive governmental entity or private entity. In contrast, the branch 122(2) may be designated as a lower security risk branch as the underlying hardware components and/or software components that support the one or more operations network nodes in the branch are located in a country with a comparatively less intrusive governmental entity or private entity. In this way, the mesh network 100 may be configured to route network data traffic of different data sensitivity levels through the different branches. The data sensitivity level may correlate to an amount of potential security risk due to data monitoring and/or interception that an owner of the data is willing to tolerate for the data. For example, network data traffic of a higher data sensitivity level from a first client device may be routed through the branch 122(2), while network data traffic of a lower data sensitivity level from a second client device may be routed through the branch 122(1). Furthermore, the doubling number of procurement and maintenance network nodes in the groups 120(1) and 120(2), respectively, from the corresponding groups 118(1) and 118(2) in the previous tier to the egress tier in the same fashion provides support for the double number of operations network nodes in the group 120(3).

However, in other embodiments, the number of network nodes in each group of the egress tier may also be increased as a multiplication factor of the number of operations network node branches that are configured in the third tier. The increased number of branches may be further correlated with the level of security risk in different jurisdictions and/or the data sensitivity level of data transiting the branches. For example, the number number of network nodes in each group of the egress tier may triple for three branches, quadruple for four branches, and so on and so forth.

The deployment of a software define mesh network, such as the mesh network 100, may include the mesh network provider initially developing an architecture plan for the mesh network 100. The mesh network provider is a service provider that configures and deploys customized software-defined traffic routing networks for various clients, in which the clients may include individuals and organizations. Parameters for creating the architecture plan, such as the number of tiers, the number of the different types of network nodes in each of the tiers, the number of exit network nodes, the connection paths between network nodes, and/or so forth may be determined based on the specifications and requirement of a client.

In order to implement the architecture plan as the mesh network, the mesh network provider may establish an independent entity, such as an independent company, for each tier of network nodes in the architecture plan. Each independent entity is established with its own website and uses its own registered agent. There are no legal or business associations between the independent entities, and the independent entities are not associated with the mesh network provider in any way. The independent entities have separate financial accounts and are configured so that there are no identifiable shared traits, such as business information, network, administrative traits, financial activities, accounting activities, and/or so forth among the independent entities.

Subsequently, the mesh network provider may use these multiple independent entities and their corresponding procurement network nodes to procure network nodes in the architecture plan for the mesh network. For example, for the mesh network 100, the mesh network provider may initially use a computing device with Internet access to procure the hardware and/or software components for the group 116(1) of procurement network nodes, the group 116(2) of maintenance network nodes, and the group 116(3) of operations network nodes of the first tier. The computing device may be a computer that is tied to one of the independent entities established by the mesh network provider i.e., Entity A. In some instances, Entity A may be explicitly and publicly associated with the mesh network provider.

Accordingly, the computing device may be purchased or otherwise acquired by Entity A, and the digital fingerprint of the computing device (e.g., network address, device registration, operating system registration, etc.) is associated with entity A. As such, the computing device may be used by a user to procure the hardware and/or software components for the group 116(1), the group 116(2), and the group 116(3) of the first tier in the mesh network 100 in a series of online transactions with third-party hardware vendors, software vendors, and/or cloud service providers (vendors). The online transactions may include purchase transactions, service contracts, licensing transactions, and/or other types of transactions in which monetary funds are provided by Entity A in exchange for goods or services. The monetary funds may be in the form of fiat currency, cryptocurrency, and/or other types of pseudonymous currencies that are provided by Entity A to the third-party hardware vendors, software vendors, and/or cloud service providers. Accordingly, the network nodes in the first tier of the mesh network may be publicly associated with Entity A.

Once the network nodes for the first tier are procured by Entity A, the mesh network provider may use the one or more procurement network nodes in the group 116(1) of the first tier to acquire the network nodes for a second tier. These procurement network nodes of the first tier may be used as VPNs by the mesh network provider to procure the hardware and/or software components for the group 118(1) of procurement network nodes, the group 118(2) of maintenance network nodes, and the group 118(3) of operations network nodes in the second tier of the mesh network 100 on behalf of Entity B that is established for the second tier. For example, a VPN connection hop may be established between the computing device and a procurement network node in the group 116(1) of the first tier. The computing device is then used by a user to procure the hardware and/or software components in a series of online transactions with third-party hardware vendors, software vendors, and/or cloud service providers that are routed through the VPN connection hop, such that the transactions may appear to have originated from the procurement network node in the group 116(1) of the first tier. The online transactions may include purchase transactions, service contracts, licensing transactions, and/or other types of transactions in which monetary funds are provided by Entity B in exchange for goods or services. The monetary funds may be in the form of fiat currency, cryptocurrency, and/or other types of pseudonymous currencies. Accordingly, the network nodes in the second tier of the mesh network may be publicly associated with Entity B based on the transaction details (e.g., purchaser or contracting party information) of the online transactions.

Likewise, once the network nodes for the second tier are procured by Entity B, the mesh network provider may use the one or more procurement network nodes in the group 118(1) of the second tier to acquire the network nodes for a third tier. These procurement network nodes of the second tier may be used as VPNs by the mesh network provider to procure the hardware and/or software components for the group 120(1) of procurement network nodes, the group 120(2) of maintenance network nodes, and the group 120(3) of operations network nodes in the third tier of the mesh network 100 on behalf of Entity C that is established for the third tier. For example, a first VPN connection hop may be established between the computing device and a procurement network node in the group 116(1) of the first tier, and a second VPN connection hop may be established between the procurement network node in the group 116(1) and a procurement network node in the group 118(1) of the second tier. The computing device is then used by a user to procure hardware and/or software components in a series of online transactions with third-party hardware vendors, software vendors, and/or cloud service providers that are routed through the VPN connections, such that the transactions may appear to have originated from the procurement network node in the group 118(1) of the second tier. The online transactions may include purchase transactions, service contracts, licensing transactions, and/or other types of transactions in which monetary funds are provided by Entity C in exchange for goods or services. The monetary funds may be in the form of fiat currency, cryptocurrency, and/or other types of pseudonymous currencies. Accordingly, the network nodes in the third tier of the mesh network may be publicly associated with Entity C based on the transaction details of the online transactions. In this way, the procurement network nodes in a previous tier that are associated with a prior entity may be used as VPN connection hops for procuring network nodes for a subsequent tier that are associated with a successive independent entity created for the purpose until network nodes for all tiers in a mesh network are procured.

Accordingly, the discussion of the procurement of the network nodes in relation to the mesh network 100 is merely an example, and similar procurement processes may be used to procure network nodes for other architecture plans with more or fewer tiers in a similar manner in other embodiments. In various embodiments, the network nodes of each particular type (e.g., operations network nodes) in each tier may include software services procured from at least two different third-party cloud service providers and/or at least two different ISPs. This may provide an additional measure of network redundancy such that a service failure by one service provider does not result in the complete failure of the network nodes of the particular type in the tier or the complete failure of all the network nodes in the tier. In some alternative embodiments, the mesh network provider may establish a corresponding independent entity for the acquisition of and association with each of the network nodes in a specific tier. For example, each of the exit network nodes may be publicly associated with a different independent entity.

Figure 2:
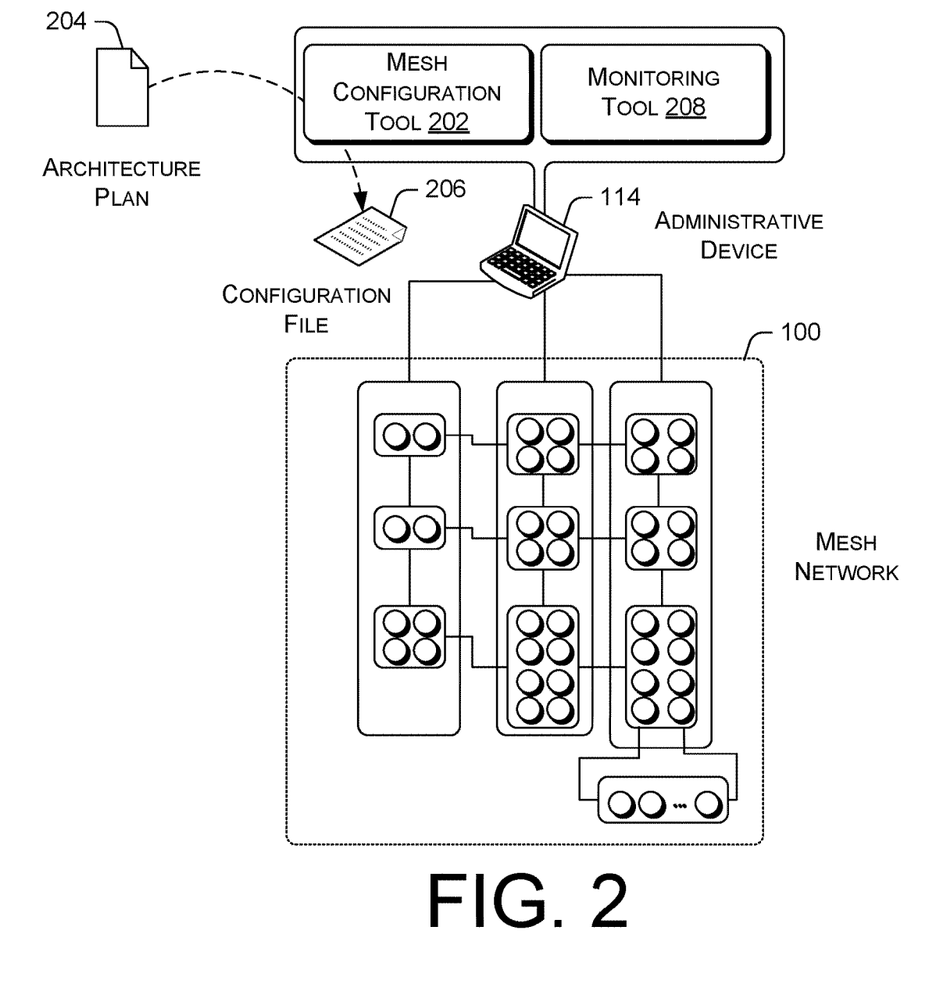
FIG. 2 is a block diagram showing the use of a configuration file to configure multiple tiers of network nodes into a software-defined traffic routing mesh network.

FIG. 2 is a block diagram showing the use of a configuration file to configure multiple tiers of network nodes into a software-defined traffic routing mesh network. In various embodiments, a mesh configuration tool 202 may receive the input of an architecture plan 204 that is generated by an administrative based on the specifications for the mesh network. The mesh configuration tool 202 may further receive node information for the network nodes that are procured for the mesh network. For example, the information for each network node may include the network addresses (e.g., IP addresses) associated each network node, the identifiers (e.g., device identifiers, service identifiers, service provider identifiers, network node type identifiers, node tier identifiers, failover role identifiers, etc.) associated with each network node, the credentials associated with each network node (e.g., IP Sec authentication keys, authentication credentials, digital certificates, etc.) and/or forth. For example, an identifier "1A" of a network node may identify a primary operations network node in the first tier, while an identifier "21A" may identify an operations network node in the first tier, in which the leading "2" indicates the failover role of the node, i.e., it is the secondary node.

Accordingly, the mesh configuration tool 202 may use the architecture plan and the node information of the network nodes to generate a configuration file for configuring the procured network nodes into a mesh network. The mesh configuration tool 202 may be a software application that executes in the administrative device 114, in which the tool uses rules, scripts, and/or algorithms to transform the node information of the procured networks into a configuration file, such as the configuration file 206. Alternatively, the mesh configuration tool 202 may receive a configuration file that is manually created by a user of the mesh configuration tool 202 based at least on the architecture plan and the node information of the procured network nodes. Subsequently, the mesh configuration tool 202 may implement the configuration file 206 to create the mesh network specified by the architecture plan 204. For example, the configuration file 206 may include a set of build scripts that are uploaded by the mesh configuration tool 202 into every network node, in which the scripts set up a process on each network node that runs on boot-up to establish networking between the various network nodes.

In various embodiments, the configuration file 206 may specify the identifier, internal IP addresses used for communication connections, connections upstream and downstream for the network nodes, and encrypted keys to be used for the connections of the network nodes. In addition, if a network node is a non-primary node in a failover group, the configuration may specify the startup of a background service. This background service may monitor the health of the one or more corresponding primary nodes in a tier. Accordingly, in the event that one or more corresponding primary nodes experience failure, the non-primary node may start up the IPsec connections that support network data traffic and broadcast itself as the new route through the tier. The configuration file 206 may further configure each network node in the mesh network with a maintenance interface, in which the maintenance interface may be used to maintain a channel for monitoring the network node. Each maintenance interface may be provided with a unique IP address such that a monitoring tool 208 executing on the administrative device 114 may monitor the status of every individual network node of the mesh network. Additionally, the monitoring tool 208 may include software applications that track network data activities (e.g., sensitive searches, messages, etc.) that are routed through the operations network nodes of the mesh network, so that such activities are internally logged and traceable via the monitoring tool. In various embodiments, the mesh network provider may provide a computing device of a client who is using a particular mesh network with networked access to a monitoring tool that is monitoring the particular mesh network, such that the client may track and audit network data activities that are routed through the particular mesh network. Furthermore, the configuration file 206 may specify that a connection to the maintenance lane in each tier is always running for every network node. In normal operation, these connections make it possible for any device connected to any network node on the first tier to reach all the way out to the far reaches of the exit node tier at all times.

Once every network node has implemented its basic configurations, the mesh configuration tool 202 may implement the connection parameters for network node connections (e.g., IPSec connections) that form the VPN connection hops according to the configuration file 206. For example, as specified in the configuration file 206, a connection from an operations network node in the first tier to an operations network node in the second tier must be represented on both sides of a connection configuration notation as 1A→1A2A. Further, a "left subnet" for a connection is the subnet that a current node (e.g., node 1A) is broadcasting to the node on the other side of the configuration notation. On the other hand, the "right subnet" is the subnet of the node (e.g., node 2A) that is being routed to by the connection. Thus, in the 1A→1A2A example, the connection configuration may be written in the following form:

| | |
|---|---|
| 1A: left subnet = 10.0.0.1/32 | right subnet = 10.0.0.2/24 |
| 1A2A: left subnet = 10.0.0.2/24 | right subnet = 10.0.0.1/32 |

As implemented via the configuration file 206, the left and right subnets are generally reversed from tier to tier for network node connections in the mesh network. However, there are exceptions in some instances. For example, when the subnets being routed from tier to tier are not symmetrically reversed, it may be because of a configuration setting to enforce security to prevent traversal of network data traffic from higher security risk network regions to lower security risk network regions, and/or vice versa. In other instances, the lack of subnet reversal may reflect a change in the network topology in the mesh network. For example, for the division of the operations network nodes in the third tier of the mesh network 100 into the branches 122(1) and 122(2), the downstream connections may be provided from exit to "/24", but the upstream broadcasts at "/26". This means that network nodes upstream can see the entire mesh network but network data traffic going out to an exit network node must take the specified branch to get there.

As an illustrative example, the layout of the IPSec connections for the example mesh network 100 shown in FIG. 1 may be written as follows:

Tier 1 Ops:
    tier 1 ops upstreams: left subnet set to 10.0.0.2/32|right subnet set to 10.0.0.3/24
    tier 1 maintenance connections: left subnet set to [node maintenance ip]/32|right subnet set to 10.1.0.2/24

Tier 1 Maintenance:
    tier 1 ops connections: left subnet set to 10.1.0.2/24|right subnet set to [node maintenance ip]/32 upstream maintenance connections: left subnet set to 10.1.0.2/28|right subnet set to 10.1.0.19/24

Tier 2 Ops:
  tier 1 ops downstreams: left subnet set to 10.0.0.3/24|right subnet set to 10.0.0.2/32
  tier 3A ops upstreams: left subnet set to 10.0.0.3/24|right subnet set to 10.0.0.4/26
  tier 3B ops upstreams: left subnet set to 10.0.0.3/24|right subnet set to 10.0.0.69/26
  tier 2 maintenance connections: left subnet set to [node maintenance ip]/32|right subnet set to 10.1.0.19/24

Tier 2 Maintenance:
  tier 1 maintenance downstream connections: left subnet set to 10.1.0.19/24|right subnet set to 10.1.0.2.28
  tier 2 ops connections: left subnet set to 10.1.0.19/24|right subnet set to [node maintenance ip]/32
  tier 3A upstream maintenance connections: left subnet set to 10.1.0.19/24|right subnet set to 10.1.0.36/28
  tier 3B upstream maintenance connections: left subnet set to 10.1.0.19/24|right subnet set to 10.1.0.53/28

Tier 3A Ops:
  tier 2 ops downstream connections: left subnet set to 10.0.0.4/26|right subnet set to 10.0.0.3/24
  tier 3A maintenance connections: left subnet set to [node maintenance ip]/32|right subnet set to 10.1.0.36/24
  branch 3A exit connections: left subnet set to 10.0.0.4/24|right subnet set to [exit network node ops ip]/32

Tier 3A Maintenance:
  tier 2 maintenance downstream connections: left subnet set to 10.1.0.36/28|right subnet set to 10.1.0.19/24
  tier 3A ops connections: left subnet set to 10.1.0.36/24|right subnet set to [node maintenance ip]/32
  branch 3A exit connections: left subnet set to 10.1.0.36/24|right subnet set to [exit network node maintenance ip]/32

Tier 3B Ops:
  tier 2 ops downstream connections: left subnet set to 10.0.0.69/26|right subnet set to 10.0.0.3/24
  tier 3B maintenance connections: left subnet set to [node maintenance ip]/32|right subnet set to 10.1.0.53/24
  branch 3B exit connections: left subnet set to 10.0.0.69/24|right subnet set to [exit network node ops ip]/32

Tier 3B Maintenance:
  tier 2 maintenance downstream connections: left subnet set to 10.1.0.53/28|right subnet set to 10.1.0.19/24
  tier 3B ops connections: left subnet set to 10.1.0.53/24|right subnet set to [node maintenance ip]/32
  branch 3B exit connections: left subnet set to 10.1.0.53/24|right subnet set to [exit network node maintenance ip]/32

Branch 3A Exit:
  tier 3A downstream connections: left subnet set to [exit network node ops ip]/32|right subnet set to 10.0.0.4/24
  tier 3A maintenance connections: left subnet set to [node maintenance ip]/32|right subnet set to 10.1.0.36/24

Branch 3B Exit:
  branch 3B exit connections: left subnet set to [exit network node ops ip]/32|right subnet set to 10.0.0.69/24
  tier 3B maintenance connections: left subnet set to [node maintenance ip]/32|right subnet set to 10.1.0.53/24

Example Computing Environment

Figure 3:
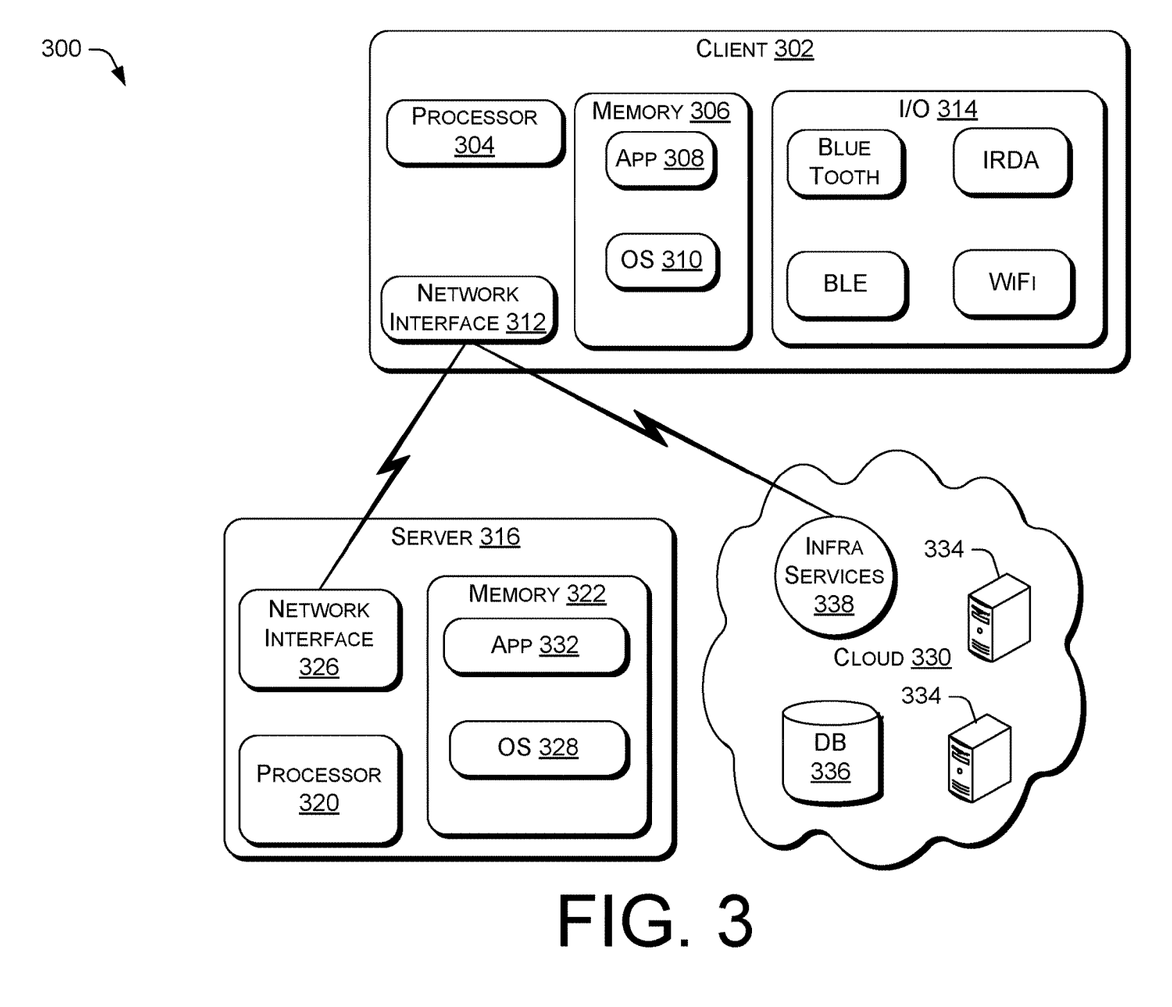
FIG. 3 is a block diagram showing various components of a computing environment for implementing the software-defined traffic routing mesh network that routes network data traffic and modifies the digital signature of the network data traffic.

FIG. 3 is a block diagram showing various components of a computing environment 300 for implementing the software-defined traffic routing mesh network that routes network data traffic and modifies the digital signature of the network data traffic. The computing environment 300 is generally hosted on computing devices. Exemplary computing devices include without limitation on the client-side: mobile devices (including smartphones), tablet computers, laptops, and embedded systems suitable for hosting IoT sensors and add-on devices. Exemplary computing devices on the server-side include without limitation: mainframes, physical servers, and virtual machines. Generally, the computing devices are networked.

A client-side computing device 302, or client device for short, may have a processor 304, and a memory 306. The processor may be a central processing unit, and/or a dedicated controller such as a microcontroller. Memory 306 is any computer-readable media that may store several software components including applications 308, an operating system 310, and/or other software components. The applications 308 may include an internet browser or application integrating internet browsing capability. In general, a software component is a set of computer-executable instructions stored together as a discrete whole. Operating system 310 and applications 308 are themselves software components or integrated aggregations of software components. Examples of software components include binary executables such as static libraries, dynamically linked libraries, and executable programs. Other examples of software components include interpreted executables that are executed on a run time such as servlets, applets, p-Code binaries, and Java binaries. Software components may run in kernel mode and/or user mode.

Computer-readable media includes, at least, two types of computer-readable media, namely computer storage media and communications media. Computer storage media includes volatile and non-volatile, removable, and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), Blu-Ray, or other optical storage, magnetic cassettes, magnetic tape, magnetic disk storage, or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. As defined herein, computer storage media does not include communication media.

The client computing device 302 may further include a network interface 312 and/or an input/output (I/O) interface 314. The network interface 312 may potentially work in concert with the I/O interface 314 and may be a network interface card supporting Ethernet and/or Wi-Fi and/or any number of other physical and/or datalink protocols. Alternatively, the network interface 312 may be an interface to a cellular radio.

The I/O interface 314 may be any controller card, such as a universal asynchronous receiver/transmitter (UART) used in conjunction with a standard I/O interface protocol such as RS-232 and/or Universal Serial Bus (USB). Client devices 302 range widely in form factors. For the smaller form factors, in particular for embedded systems and IoT devices, communications protocols supported by the network interface 312 in conjunction with the I/O interface 314 include without limitation BlueTooth™, BlueTooth Low Energy (BLE), Infrared (IRDA), and Zigbee™.

The server-side computing device 316, or server for short, is any computing device that may participate in a network. The network may be, without limitation, a local area network (LAN), a VPN, a cellular network, or the Internet. The server 316 has hardware components analogous to the client-side computing device 302. Specifically, it will include a processor 320, a memory 322, an input/output interface 324, and/or a network interface 326. The memory 322 may store an operating system 328 and applications 332. Server hardware 316 differs from client hardware 302 in that processing power is generally more powerful to handle concurrent processes running and network capacity is greater to communicate with multiple clients 302. Server-side applications 332 may include libraries and run-times (e.g., to run interpreted code). Server-side applications 332 may include not only web servers (also called application servers) and databases, but also server software providing functionalities to the computing environment 300.

In general, software of the computing environment 300 may be implemented as a software service on a physical server 316. However, such a software service may also be hosted on the cloud 330 via a cloud service 338. Specifically, a cloud service 338 is comprised of multiple physical computer servers which are disaggregated via a hypervisor. The physical computer servers each may have one or more processors, memory, at least I/O interface, and/or network interface. The features and variations of the processors, memory, the I/O interface, and the network interface are substantially similar to those described for the physical computer server 316 described above.

A cloud service 338 includes a hypervisor that can delegate calls to any portion of hardware in the underlying physical servers, and upon request generate a virtual machine from the separate portions of hardware, regardless of physical server (a process called disaggregation). Just as a physical server 316, a virtual machine may host not only software applications, components including services, but also virtual web servers 334 functionality and virtual storage/database 336 functionality.

Note that virtual machines themselves may be further partitioned into containers, which enable the execution of a program in an independent subset of the virtual machine. Software such as Kubernetes, Mesos, and Docker are examples of container management software. Unlike virtual machines which have a delay in startup due to the need for provisioning an entire OS, containers may be generated more quickly and on-demand since the underlying virtual machine is already provisioned. The cloud service 338 may embody an abstraction of services. Common examples include service abstractions such as Platform as a Service (PAAS), Infrastructure as a Service (IAAS), and Software as a Service (SAAS). The various software components of the computing environment 300 (e.g., engines, modules) may be implemented via the server 316 and/or the cloud 330. Such components may be implemented using computer routines, program instructions, objects, and/or data structures that perform particular tasks or implement particular abstract data types.

Example Process

Figure 4:
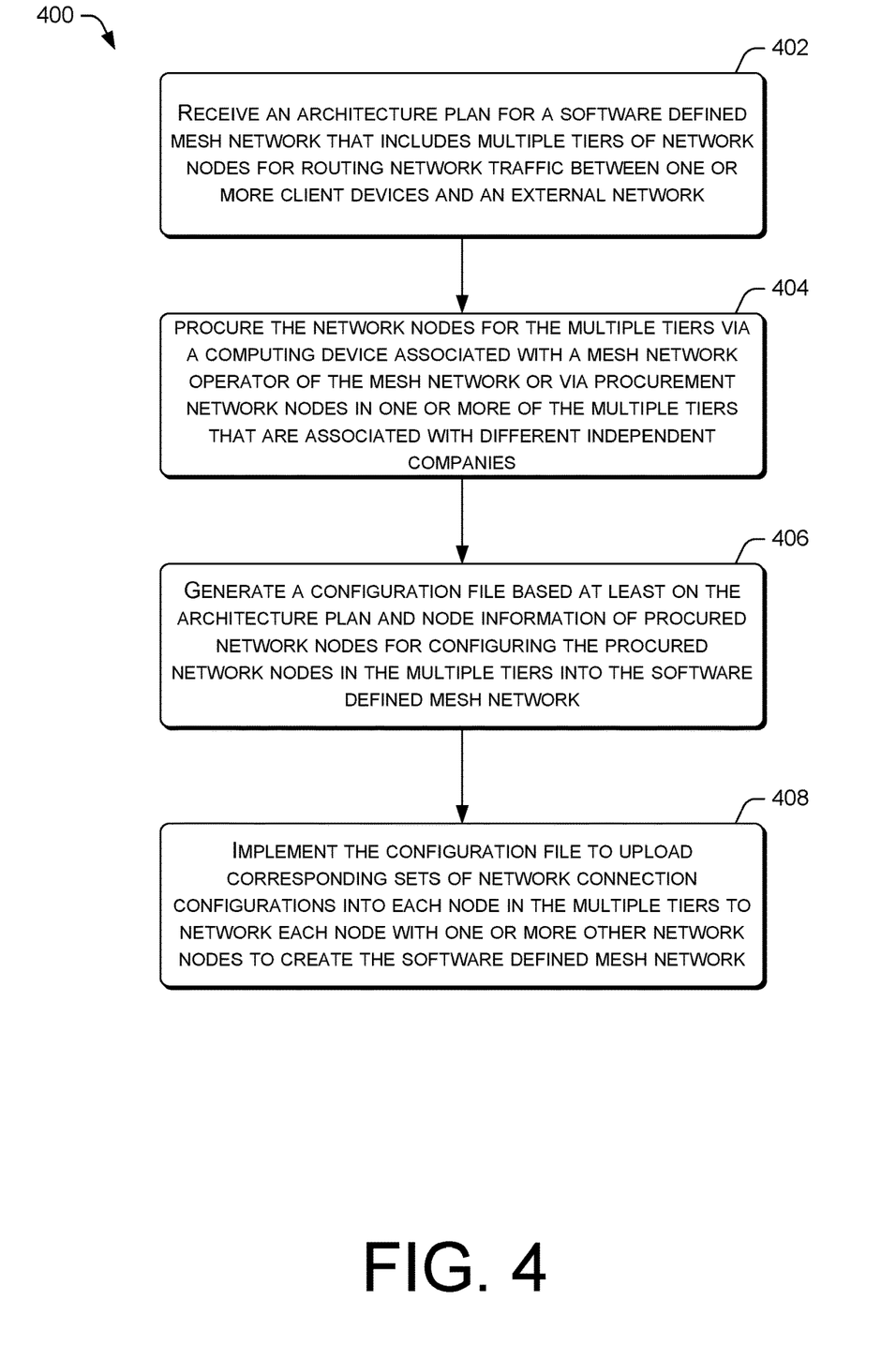
FIG. 4 is a flow diagram of an example process for implementing a software-defined traffic routing mesh network that routes network data traffic and modifies the digital signature of the network data traffic.

FIG. 4 is a flow diagram of an example process 400 for implementing a software-defined traffic routing mesh network that routes network data traffic and modifies the digital signature of the network data traffic. The process 400 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the process 400 is described with reference to the software-defined traffic routing mesh network 100 of FIG. 1.

At block 402, a computing device of a software-defined traffic routing mesh network may receive an architecture plan for a software-defined traffic routing mesh network that includes multiple tiers of network nodes for routing network data traffic between one or more client devices and an external network. In various embodiments, the external network is the Internet.

At block 404, the network nodes for the multiple tiers may be procured via the computing device associated with a mesh network provider of the mesh network or via procurement network nodes in one or more of the multiple tiers that are associated with different independent entities. In various embodiments, the procurement of a network node may include the procurement of hardware and/or software components for the network node in one or more online transactions with third-party vendors.

At block 406, the computing device may generate a configuration file based at least on the architecture plan and node information of the procured network nodes. The configuration file for configuring the procured network nodes in the multiple tiers into the software-defined traffic routing mesh network.

At block 408, the computing device may implement the configuration file to upload corresponding sets of network connection configurations into each node in the multiple tiers to network each node with one or more other network nodes to create the software-defined traffic routing mesh network.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:
1. A software-defined traffic routing mesh network, comprising:
   a first plurality of operations network nodes having at least one processor and memory configured with software to route network traffic data between one or more client devices and an external network;
   a second plurality of maintenance network nodes that provide maintenance services for at least the first plurality of operations network nodes; and a third plurality of procurement network nodes that are used to procure each operations network node by being used to procure at least one of a hardware component or a software component for each operations network node from one or more third-party vendors, wherein each of the first plurality of operations network nodes, the second plurality of maintenance network nodes, and the third plurality of procurement network nodes are deployed in the software-defined traffic routing mesh network based on an architecture plan that includes multiple tiers and based on a configuration file for configuring the network nodes in the multiple tiers; and wherein the first plurality of operations network nodes include a set of operations network nodes in a tier that is divided into multiple branches with different security risk levels for routing data with different levels of data sensitivity.

2. The software-defined traffic routing mesh network of claim 1, wherein the third plurality of procurement network nodes are further used to procure each maintenance network node by being used to procure at least one of a hardware component or a software component for each maintenance network node from the one or more third-party vendors.

3. The software-defined traffic routing mesh network of claim 1, wherein each of the multiple tiers corresponds to a different legal jurisdiction.

4. The software-defined traffic routing mesh network of claim 3, wherein the multiple tiers include a first tier of network nodes that is located in a first country and a second tier of network nodes that is located in a second country.

5. The software-defined traffic routing mesh network of claim 1, wherein the external network includes the Internet, and further comprising a tier of one or more exit network nodes that connect the plurality of operations network nodes to the Internet.

6. The software-defined traffic routing mesh network of claim 1, wherein each network node in a first tier of the multiple tiers is procured via a computing device that is associated with a mesh network provider that operates the software-defined traffic routing mesh network.

7. The software-defined traffic routing mesh network of claim 6, wherein each network node in a subsequent tier of the multiple tiers is procured using a procurement network node in a previous tier in the multiple tiers, and wherein the procurement network node in the previous tier is associated with an independent entity that operates independently from the mesh network provider and from an additional independent entity that is associated with an additional procurement network node in the subsequent tier.

8. The software-defined traffic routing mesh network of claim 1, wherein each network node of the software-defined traffic routing mesh network is configured to connect to one or more other network nodes by a configuration file that uploads network connection settings into each network node.

9. The software-defined traffic routing mesh network of claim 1, wherein the maintenance services provided by the second plurality of maintenance network nodes include at least one of monitoring, configuring, or access to the first plurality of operations network nodes.

10. The software-defined traffic routing mesh network of claim 1, wherein the plurality of operations network nodes provides one or more secure private channels for routing the network data traffic between the one or more client devices and the external network through the multiple tiers.

11. The software-defined traffic routing mesh network of claim 10, wherein a secure private channel includes multiple virtual private network (VPN) hops that connect corresponding operations network nodes in the multiple tiers.

12. A computer-implemented method, comprising:

receiving an architecture plan for a software-defined traffic routing mesh network that includes multiple tiers of network nodes for routing network data traffic between one or more client devices and an external network;

procuring the network nodes for the multiple tiers via a computing device associated with a mesh network provider or via procurement network nodes in one or more of the multiple tiers that are associated with different independent entities;

generating a configuration file based at least on the architecture plan and node information of procured network nodes, the configuration file for configuring the network nodes in the multiple tiers into the software-defined traffic routing mesh network; and implementing the configuration file to upload corresponding sets of network connection configurations into each node in the multiple tiers to network each node with one or more other network nodes to create the software-defined traffic routing mesh network, wherein the software-defined traffic routing mesh network includes a first plurality of operations network nodes, a second plurality of maintenance network nodes, and a third plurality of procurement network nodes, wherein each of the first plurality of operations network nodes, the second plurality of operations network nodes, and the third plurality of procurement network nodes are organized into the multiple tiers; and wherein the first plurality of operations network nodes include a set of operations network nodes in a tier that is divided into multiple branches with different security risk levels for routing data with different levels of data sensitivity.

13. The computer-implemented method of claim 12, wherein the implementing includes implementing the configuration file to configure the plurality of operations network nodes to provide a secure private network channel for routing the network data traffic between the one or more client devices and the external network through the multiple tiers.

14. The computer-implemented method of claim 12, wherein the external network includes the Internet, and wherein the multiple tiers comprise a tier of one or more exit network nodes that connect the first plurality of operations network nodes to the Internet.

15. The computer-implemented method of claim 12, wherein the procuring further comprises procuring, via a computing device, at least one of a hardware component or a software component for each network node of the first plurality of operations network nodes, the second plurality of maintenance network nodes, and the third plurality of procurement network nodes that are in a first tier of the multiple tiers using corresponding online transactions.

16. The computer-implemented method of claim 15, wherein the procuring further comprises procuring, via at least a virtual private network (VPN) connection hop between the computing device and a procurement network node in the first tier that is associated with a first independent entity, at least one of a hardware component or at least one of a hardware component or a software component for each network node that is in a second tier of the multiple tiers using corresponding second online transactions, the second tier being associated with a second independent entity.

17. The computer-implemented method of claim 16, wherein the procuring further comprises procuring, via at least the VPN connection hop between the computing device and a procurement network node in the first tier that is associated with a first independent entity, and a second VPN connection hop between the procurement network node and an additional procurement network node in the second tier that is associated with a second independent entity, at least one of a hardware component or at least one of a hardware component or a software component for each network node that is in a third tier of the multiple tiers using corresponding third online transactions, the third tier being associated with a third independent entity.

18. One or more non-transitory computer-readable media storing computer-executable instructions that upon execution cause one or more processors to perform acts comprising:

receiving an architecture plan for a software-defined traffic routing mesh network that includes multiple tiers of network nodes for routing network data traffic between one or more client devices and an external network;

procuring the network nodes for the multiple tiers via a computing device associated with a mesh network provider or via procurement network nodes in one or more of the multiple tiers that are associated with different independent entities;

generating a configuration file based at least on the architecture plan and node information of procured network nodes, the configuration file for configuring the network nodes in the multiple tiers into the software-defined traffic routing mesh network; and implementing the configuration file to upload corresponding sets of network connection configurations into each node in the multiple tiers to network each node with one or more other network nodes to create the software-defined traffic routing mesh network, wherein the software-defined traffic routing mesh network includes a first plurality of operations network nodes, a second plurality of maintenance network nodes, and a third plurality of procurement network nodes, wherein each of the first plurality of operations network nodes, the second plurality of operations network nodes, and the third plurality of procurement network nodes are organized into the multiple tiers; and wherein the first plurality of operations network nodes include a set of operations network nodes in a tier that is divided into multiple branches with different security risk levels for routing data with different levels of data sensitivity.

* * * * *